Figure 1:
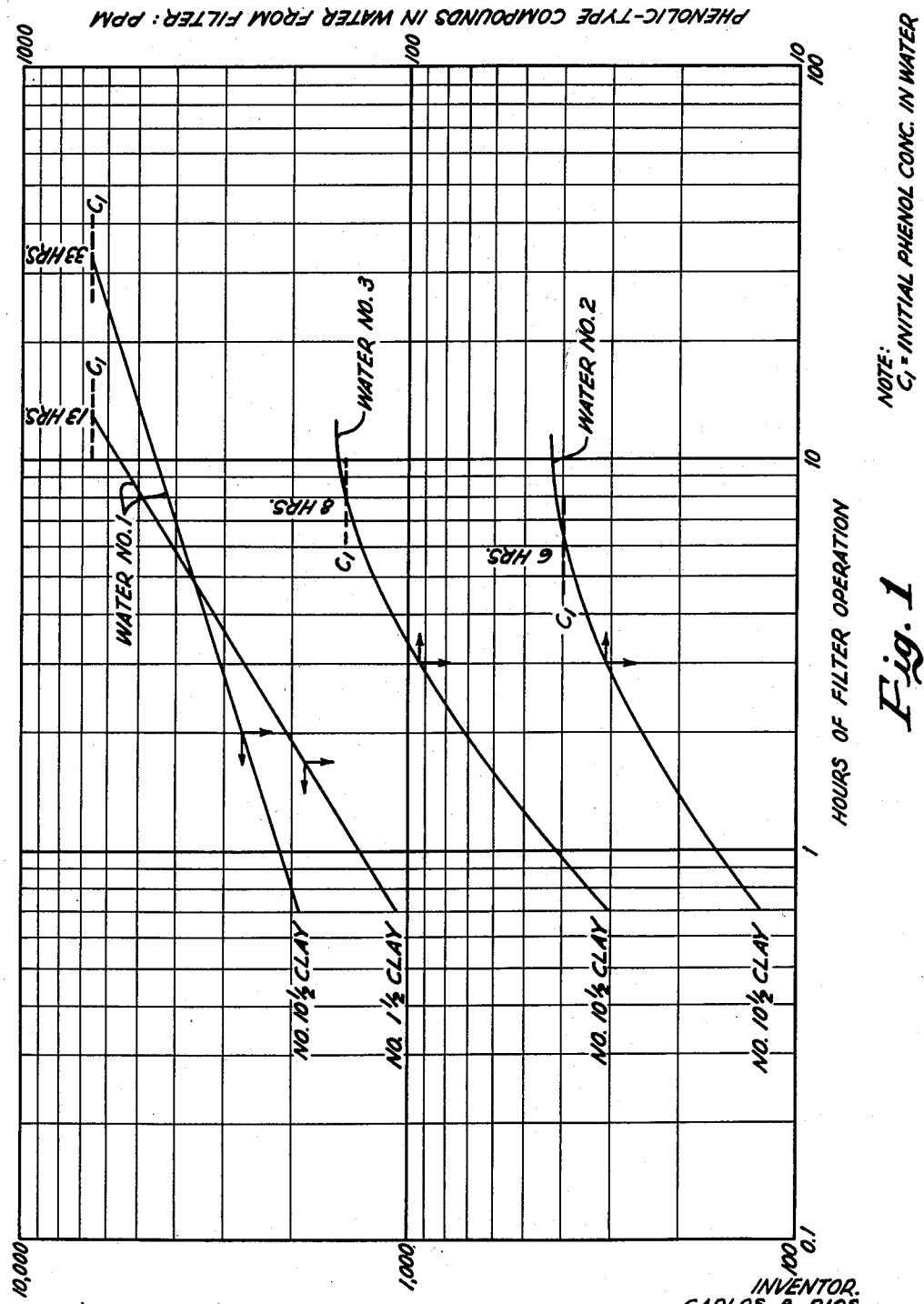

May 17, 1960  C. B. RIOS  2,937,142
REMOVAL OF PHENOLIC COMPOUNDS FROM AQUEOUS SOLUTIONS
Filed June 28, 1955

INVENTOR.
CARLOS B. RIOS
BY
HIS ATTORNEY

2,937,142
REMOVAL OF PHENOLIC COMPOUNDS FROM AQUEOUS SOLUTIONS

Carlos B. Rios, Secane, Pa., assignor to Gulf Oil Corporation, Pittsburgh, Pa., a corporation of Pennsylvania Application June 28, 1955, Serial No. 518,533

8 Claims. (Cl. 210—40)

This invention relates to improved procedure for separating phenolic substances from aqueous solutions and in particular from industrial waste water containing phenolic substances in relatively small amounts.

It is well known that industrial operations of various kinds frequently involve the utilization of large amounts of water which become contaminated with phenolic substances such as phenol, cresols, etc. In many of these operations the disposal of the water containing phenolic substances is a problem. Regulations make it impossible to simply dump such waste water into streams, even if such method of disposal were desirable. Various methods have been proposed for removing phenolic substances from waste water but they have been relatively expensive or inefficient. Therefore, the removal of phenolic substances from aqueous solutions and in particular from waste water containing small amounts is a problem which has not been completely solved.

This invention has for its object to provide an improved process for removing phenolic substances from aqueous solutions and especially from waste water containing phenolic substances in small amounts. Another object is to provide a relatively economical method for removing phenolic substances from waste water. Another object is to provide procedure for utilizing a waste substance for the removal of phenolic substances from waste water. Another object is to improve the state of the art. Other objects will appear hereinafter.

These and other objects are accomplished by my invention which includes contacting the aqueous solution containing the phenolic substance with a clay adsorbent which has been used in a process in which carbonaceous material is deposited upon the clay adsorbent and the clay adsorbent bearing the deposited carbonaceous material is subjected to a combustion regeneration to burn off the carbonaceous material, said process in which carbonaceous material is deposited upon the clay adsorbent being a decolorizing process, a catalytic cracking process or a process for refining a petroleum distillate. After contacting the aqueous solution containing the phenolic substance with the used clay adsorbent, water containing a lower phenolic content is removed from the adsorbent clay.

I have discovered that clay adsorbents ordinarily used for purification of organic substances of various types and which have been regenerated by combustion have good adsorbent power for phenolic substances in aqueous solutions and especially for phenolic substances contained in waste water in small amounts. The phenolic adsorbing power of the adsorbent clay is improved by use in the purification process. Thus the adsorbent clay when used in the purification process becomes progressively deactivated for removal of impurities and, therefore, progressively less satisfactory as a purification agent. However, the adsorbent clay becomes simultaneously progressively more satisfactory for removal of phenolic substances from waste waters. Therefore in its preferred embodiment my invention contemplates the employment of an adsorbent clay which has been used in a purification process and preferably to such an extent that it is unsatisfactory for further use in the purification process. Such a more or less completely spent adsorbent clay has optimum properties for use in the removal of phenolic substances in aqueous solutions.

It is well known to use adsorbent clays of the type known as fuller's earth, bauxite, Florida-Georgia earth, etc. to refine or decolorize various materials. Thus these adsorbent clays are used to decolorize animal and vegetable oils. They are also used in large quantities to decolorize petroleum lubricating oils. They are also used to refine other petroleum distillates such as gasoline. In these refining processes it is customary to treat the material to be refined with the adsorbent clay until the adsorbent power is more or less depleted. The clay is then washed with a solvent such as naphtha to remove adherent purified material and is then subjected to a combustion treatment at about 1000°–1400° F. to burn off the adsorbed carbonaceous colored bodies and other impurities. The adsorbent clay is then re-used in the purification process. After repeated re-use and regeneration the clay loses its purifying power. This takes place after from about 2 to 50 regenerations depending upon the clay, the material being purified and the conditions of regeneration. Such clays after one or more regenerations are satisfactory for use in my invention. As indicated above I prefer to employ a clay which has been used to the stage where it has substantially lost its utility in the purification process. However, the phenol removal power is improved by a single regeneration, and I include the use of clays having had one or more regenerations in a purification process within the scope of my invention. Clays from the purification process may be used for the removal of phenols from water either after they have been regenerated by combustion or as they are obtained from the purification, i.e. while still containing the tars and color bodies adsorbed in the purification process. In the latter case it is preferred that the clays be first washed with an oil solvent. Clays of any mesh size or pellets may be used.

My invention is also applicable to other types of adsorbent clays than those known generally as fuller's earths. For instance it is known to treat bentonite with acids such as hydrochloric acid in order to obtain what is known as an activated clay. These activated clays are used to decolorize or otherwise purify organic substances. While it is not particularly common to regenerate such activated clays after the purification treatment, this is at times practiced and such clays which have been regenerated one or more times may be employed to remove phenolic substances from aqueous solutions in accordance with my invention, such regeneration involves removal of carbonaceous material deposited upon the clay by burning or combustion. Also such activated clays and synthetic silica-alumina materials similar to activated clays are extensively used for the catalytic cracking of petroleum fractions to produce lower boiling hydrocarbons. During these catalytic cracking operations the catalyst is repeatedly regenerated by combustion at elevated temperature such as about 1000° to 1400° F. During such regeneration carbonaceous material deposited upon the catalyst is removed by combustion. These cracking catalysts eventually lose their cracking activity and are discarded as a waste material of little or no value. My invention is applicable to the utilization of these materials after one or more regenerations for removal of phenolic substances from waste water.

My invention is applicable to the removal of phenolic substances from all aqueous solutions. However it is of particular interest for the removal of phenolic substances from industrial waste waters containing phenolic materials in relatively small amounts such as about 40 parts per million to about 12,000 parts per million. It is to be understood however that lower or higher concentrations of phenolic materials in water may be treated. Thus various chemical operations, coal coking operations and especially refinery operations utilize water and result in phenolic aqueous solutions of varied concentrations which may be treated in accordance with my invention. Aqueous solutions containing phenolic substances in amounts of about 3000 to 10,000 parts per million may be treated with advantage since this particular range gives a longer life for the adsorbent clay and gives higher adsorbent efficiency. My invention is especially applicable to aqueous wastes produced in petroleum refining operations. Thus it is known to extract crude petroleum or fractions of crude petroleum with phenols or with a mixture of phenols and cresols, etc., and during such processes these phenolic substances become dissolved in water used during distillation or washing operations. During catalytic cracking of petroleum fractions water or steam is introduced during catalyst purging operations and comes into contact with the petroleum fraction undergoing cracking. Phenolic substances present or formed in the petroleum fraction become dissolved in the water and recovery or removal of these phenolic substances is desirable. Also in desalting of crude petroleum, water is used to wash out the salt and phenolic substances associated with the crude petroleum become dissolved in the water. As indicated above, I contemplate recovery of phenolic substances from all such refinery waste water.

The aqueous solution containing phenolic substance may be contacted with the used clay adsorbent in any desired manner. The above described purification processes in which the adsorbent clay is first used, frequently involve the passage of the substance to be purified through a tower packed with the adsorbent clay. If desired, the aqueous solution of phenolic material may be simply contacted with the clay adsorbent in the same tower in which the purification operation was carried out. On the other hand the used clay adsorbent may be removed and contacted in a different tower. If desired, the clay adsorbent may be used in the form of filter beds and the water simply filtered or passed through these filter beds. Also the clay adsorbent and the water may be mixed with each other and the clay adsorbent then separated from the water by settling. This last method of operation may be advantageous where the clay adsorbent is in such a finely divided condition that filtering through a bed of the finely divided material would be uneconomically slow.

Passage of the aqueous solution through the bed of used clay adsorbent is continued until the adsorption of phenolic materials ceases or decreases to an unsatisfactory degree. This can be detected by analysis since the phenolic content of the effluent water will start to rise. The operation is then terminated and the water to be treated is contacted with fresh or regenerated adsorbent.

The adsorbent containing the adsorbed phenols can be either regenerated or discarded. I prefer to regenerate the adsorbent and to recover the phenolic substance during the regeneration treatment. In accordance with this mode of operation, the clay adsorbent is first washed with a solvent for phenols. It is then steamed to remove the solvent adhering to the washed clay and the clay is then again contacted with aqueous solutions containing phenolic materials. The solvent for phenols then may be treated for instance by distillation to recover the phenols removed from the adsorbent clay. Satisfactory solvents are materials such as benzene, naphtha, gasoline and liquid propane. These materials have a good solvent power for phenolic substances and also have a relatively low boiling point so that separation from the phenols by distillation is economical. On the other hand where the recovery of the phenolic substances is not desired, the used clay adsorbent containing the phenolic substances may be regenerated by combustion, i.e. by heating to about 1000° to 1400° F. in the presence of an oxygen-containing gas such as air. In this way the phenols are burned off the clay and converted into combustion gases. The regenerated clay adsorbent is then cooled and again contacted with the aqueous phenolic solution.

In order to have a continuous process it is advantageous to utilize two contacting towers or chambers. One of these will be undergoing regeneration while the other is on stream. When the on-stream tower becomes saturated with the phenolic substance, the flow of aqueous phenolic solution will be switched to the other tower which in the meantime will have been regenerated and otherwise put in condition for adsorption of additional phenolic substances. The spent tower then will be regenerated while the adsorption is going on in the other tower. Also it may be advantageous to utilize a series of towers. Thus when the required degree of removal of phenolic substances is not accomplished in one tower, it will be desirable to utilize additional towers and pass the aqueous solution in series through the tower.

EXAMPLE

In this example the designation of the clays will be the same as that used in industry. No. ½ clay is a new clay that has never been burned or used for filtration. A No. 1 clay is one which has been burned for moisture removal once and is ready for its first use as a filter. No. 1½ clay has been used for filtration one time and has not yet been burned for removal of adsorbed reaction products. A No. 2 clay has been used once for filtration and has been burned a second time so that it is ready for a second use. This system continues so that all uses and burnings are accounted for in the final designation given the clay. No. 1½ and 10½ clays were used in the following experiments.

In this example, tests were made to determine the comparative phenol adsorption effectiveness of No. 1½ and 10½ clay which had been used to decolorize a lubricating oil (Bright Stock). In addition, this example includes tests to determine the effect of initial phenolic concentration on both the adsorption efficiency of the clay and clay life. The waste waters used for these tests were obtained from the following sources: (1) waste water from the extraction of a lubricating oil (Bright Stock) with a phenol-cresol mixture; (2) the waste water from desalting crude petroleum by washing with water; and (3) the waste water from the atmospheric tower reflux drum used in a crude petroleum distillation. Waste water #1 contained about 6000 to 7000 parts per million of phenolic material and waste waters #2 and #3 about 45 and 150 parts per million, respectively.

The test equipment consisted of a glass cylinder, 5 feet high and 2½ inches in diameter filled with the particular clay to be tested. Waste water was charged to this simulated clay tower at the top and allowed to pass downward by gravity to the bottom where it was collected for analysis. The charge rates chosen for these tests were designed to duplicate anticipated plant conditions. In this connection, three sets of data were secured using No. 10½ clay. In two cases a charge rate of 1.461 gallons of water/hour/cubic foot of clay (equivalent to 2000 barrels/day for a 30-ton capacity clay tower) was used. In the third run a reduced charge rate of 0.735 gallon of water/hour/cubic foot of clay (equivalent to 1000 barrels/day for a 30-ton capacity clay tower) was used.

The test results are shown in Table I and graphically in Figure 1. In view of the low rate at which the water was charged to the experimental filter (about 600 cc./hour), final analyses were made on cuts taken throughout each run rather than on spot samples taken at regular intervals. Maximum adsorption of phenols on the clay was determined from the laboratory data and found to agree with the Freundlich adsorption equation:

$$X = KC^N$$

where:

$X$ = amount of material adsorbed per unit weight of adsorbent
$C$ = the concentration of the substances adsorbed
$K$ and $N$ = empirically determined constants The various test runs were all of relatively short duration—about 13 to 14 hours. Consequently the first series of runs in Table I charging the high phenol waste water No. 1 through No. 10½ clay was not carried to completion. As a means of estimating the maximum adsorption of phenols on the clay and the maximum clay life, the phenol content of each cut was plotted in Figure 1. It was assumed that the concentration of a cut is approximately the same as that of the material at the mid-point of the cut. When plotted on log-log paper as in Figure 1, the data resulted in a straight line (in ac-

Table I

| Type of clay used | Spent clay No. 10½ |
| Type of water charged | Waste Water No. 1 |
| Volume of clay used, cu. ft. | 0.109 |
| Water charge rate: | |
| Gal./hr. | 0.1592 |
| Gal./hr./cu.ft. of clay | 1.461 |

| Description | Water Rate, lb./hr. | Duration of cut, Hrs. | Phenolic-type compounds, lb./cut×10⁴ | | | Wt. Percent Phenols Removed |
| --- | --- | --- | --- | --- | --- | --- |
| | | | P.p.m. | In water | Removed | |
| Water charged to filter: | | | | | | |
| Cut No. 1 | 1,326 | 2 | 6,680 | 177 | | |
| Cut No. 2 | 1,326 | 4 | 6,680 | 354 | | |
| Cut No. 3 | 1,326 | 4 | 6,680 | 354 | | |
| Cut No. 4 | 1,326 | 4 | 6,680 | 354 | | |
| Cut No. 5 | | | | | | |
| To end of run (theoretical) | 1,326 | 19 | 6,680 | 1,683 | | |
| Total | | 33 | | 2,922 | | |
| Effluent water from filter: | | | | | | |
| Cut No. 1 | 1,326 | 2 | 2,175 | 58 | 119 | 67.2 |
| Cut No. 2 | 1,326 | 4 | 3,900 | 207 | 147 | 41.5 |
| Cut No. 3 | 1,326 | 4 | 3,738 | 198 | 156 | 44.1 |
| Cut No. 4 | 1,326 | 4 | 4,410 | 234 | 120 | 33.9 |
| Cut No. 5 | | | | | | |
| To end of run (theoretical) | 1,326 | 19 | 5,962 | 1,502 | 181 | 10.8 |
| Total | | 33 | | 2,199 | 723 | 24.7 |

| Maximum adsorption of phenols, lb./cu.ft. of clay | 0.663 |
| Phenols charged to clay filter at charge rate of 1.461 gal./hr./cu.ft., lb./hr./cu.ft. of clay | 0.008126 |
| Overall phenol removal, Wt. percent | 24.7 |
| Maximum clay life, hrs. | 33.0 |

| Type of clay used | Spent clay No. 10½ |
| Type of water charged | Waste Water No. 2 |
| Volume of clay used, cu. ft. | 0.109 |
| Water charge rate: | |
| Gal./hr. | 0.1592 |
| Gal./hr./cu.ft. of clay | 1.461 |

| Description | Water Rate, lb./hr. | Duration of cut, Hrs. | Phenolic-type compounds, lb./cut×10⁶ | | | Wt. Percent Phenols Removed |
| --- | --- | --- | --- | --- | --- | --- |
| | | | P.p.m. | In water | Removed | |
| Water charged to filter: | | | | | | |
| Cut No. 1 | 1,326 | 2 | 39.8 | 106 | | |
| Cut No. 2 | 1,326 | 4 | 39.8 | 211 | | |
| Cut No. 3 | | | | | | |
| Cut No. 4 | | | | | | |
| Cut No. 5 | | | | | | |
| To end of run (theoretical) | | | | | | |
| Total | | 6 | | 317 | | |
| Effluent water from filter: | | | | | | |
| Cut No. 1 | 1,326 | 2 | 15.8 | 42 | 64 | 60.4 |
| Cut No. 2 | 1,326 | 4 | 35.0 | 186 | 25 | 11.8 |
| Cut No. 3 | | | | | | |
| Cut No. 4 | | | | | | |
| Cut No. 5 | | | | | | |
| To end of run (theoretical) | | | | | | |
| Total | | 6 | | 228 | 89 | 28.1 |

| Maximum adsorption of Phenols, lb./cu.ft. of clay | 0.000817 |
| Phenols charged to clay filter at charge rate of 1.461 gal/hr./cu.ft., lb/hr./cu.ft. of clay | 0.000485 |
| Overall phenol removal, wt. percent | 28.1 |
| Maximum clay life, hrs. | 6.0 |

Table I—Continued

| | Spent clay No. 10½ Waste Water No. 3 |
|---|---|
| Type of clay used | |
| Type of water charged | |
| Volume of clay used, cu. ft | 0.109 |
| Water charge rate: | |
| Gal./hr | 0.0801 |
| Gal./hr./cu.ft. of clay | 0.735 |

| Description | Water Rate, lb./hr. | Duration of cut, Hrs. | Phenolic-type compounds, lb./cut×10⁶ | | | Wt. Percent Phenols Removed |
|---|---|---|---|---|---|---|
| | | | P.p.m. | In water | Removed | |
| Water charged to filter: | | | | | | |
| Cut No. 1 | 0.667 | 2 | 146 | 195 | | |
| Cut No. 2 | 0.667 | 3 | 146 | 292 | | |
| Cut No. 3 | 0.667 | 3 | 146 | 292 | | |
| Cut No. 4 | | | | | | |
| Cut No. 5 | | | | | | |
| To end of run (theoretical) | | | | | | |
| Total | | 8 | | 779 | | |
| Effluent water from filter: | | | | | | |
| Cut No. 1 | 0.667 | 2 | 41 | 55 | 140 | 71.8 |
| Cut No. 2 | 0.667 | 3 | 101 | 202 | 90 | 30.8 |
| Cut No. 3 | 0.667 | 3 | 138 | 276 | 16 | 5.5 |
| Cut No. 4 | | | | | | |
| Cut No. 5 | | | | | | |
| To end of run (theoretical) | | | | | | |
| Total | | 8 | | 533 | 246 | 31.6 |

| | |
|---|---|
| Maximum adsorption of phenols, lb./cu.ft. of clay | ¹ 0.00226 |
| Phenols charged to clay filter at charge rate of 1.461 gal./hr./cu.ft., lb./hr./cu.ft. of clay | ¹ 0.00089 |
| Overall phenol removal, wt. percent | 31.6 |
| Maximum clay life, hrs | 8.1 |

¹ Based on reduced charge rate of 0.735 gal./hr./cu. ft. of clay.

cordance with the Freundlich equation). Extrapolation of this line to the initial concentration of the waste water permitted determination of the maximum life of the clay for the particular concentration of phenols in the waste water. Similar treatment of the data from the charging of waste waters numbered 2 and 3 produced substantially straight lines in Figure 1. However, for these runs extrapolation was not necessary since the runs were of greater duration than the determined clay life at these lower phenolic concentrations. Adsorption of phenols from waste water No. 1 on 1½ clay was carried to completion within the 14-hour experimental run and the results on these runs are given in Table II and are plotted in Figure 1.

Table II

| | Spent clay No. 1½ Waste Water No. 1 |
|---|---|
| Type of clay used | |
| Type of water charged | |
| Volume of clay used, cu. ft | 0.109 |
| Water charge rate: | |
| Gal./hr | 0.1592 |
| Gal./hr./cu.ft. of clay | 1.461 |

| Description | Water Rate, lb./hr. | Duration of cut, Hrs. | Phenolic-type compounds, lb./cut×10⁶ | | | Wt. Percent Phenols Removed |
|---|---|---|---|---|---|---|
| | | | P.p.m. | In water | Removed | |
| Water charged to filter: | | | | | | |
| Cut No. 1 | 1.326 | 2 | 6,600 | 175 | | |
| Cut No. 2 | 1.326 | 4 | 6,600 | 350 | | |
| Cut No. 3 | 1.326 | 4 | 6,600 | 350 | | |
| Cut No. 4 | | | | | | |
| To end of run (theoretical) | 1.326 | 3 | 6,600 | 263 | | |
| Total | | 13 | | 1,138 | | |
| Effluent water from filter: | | | | | | |
| Cut No. 1 | 1.326 | 2 | 1,325 | 35 | 140 | 80 |
| Cut No. 2 | 1.326 | 4 | 3,160 | 168 | 182 | 52 |
| Cut No. 3 | 1.326 | 4 | 4,810 | 255 | 95 | 27 |
| Cut No. 4 | | | | | | |
| To end of run (theoretical) | 1.326 | 3 | 6,020 | 239 | 24 | 9 |
| Total | | 13 | | 697 | 441 | 38.8 |

| | |
|---|---|
| Maximum adsorption of phenols, lb./cu.ft. of clay | 0.404 |
| Phenols charged to clay filter at charge rate of 1.641 gal./hr./cu.ft., lb./hr./cu.ft. of clay | 0.0803 |
| Overall phenol removal, wt. percent | 38.8 |
| Maximum clay life, hrs | 13.0 |

From the data in Table I and the curves in Figure 1, the maximum adsorption of phenols on No. 10½ clay and the maximum clay life were calculated to be as shown in Table III for the three phenolic waste waters:

Table III

|  | Phenolic-type Compounds, P.p.m. | Maximum Phenol adsorption, lb./1,000 cu. ft. clay | Maximum Clay life, Hours [1] |
|---|---|---|---|
| Water No. 1 | 6,680 | 663 | 33 |
| Water No. 2 | 39.8 | 0.82 | 6 |
| Water No. 3 | 146 | 2.25 | 8 |

[1] For 2000 b./d. of water and 30 tons of clay.

I have found that the used adsorbent clays are not only effective in removing phenolic substances but also that they are very effective for removing sulfides from waste water. Thus the data in Table IV shown exceptional removal of sulfide sulfur. They were obtained while charging water from an atmospheric tower reflux drum for distilling crude petroleum to the experimental column described in the above example and containing No. 10½ clay.

Table IV

Sulfide sulfur, p.p.m.
Charge to clay filter_____ 87.5
Cut No. 1 after 2 hr_____ Trace
Cut No. 2 after 5 hr_____ Trace
Cut No. 3 after 8 hr_____ Trace
Cut No. 4 after 11 hr_____ Trace
Cut No. 5 after 14 hr_____ Trace (By "trace" is meant an amount less than 0.1 part per million.)

From the foregoing it may be seen that continued use of a clay in a purification process increases its ability to remove phenols and also that charging waste water containing larger amounts of phenol in the 3000 to 10,000 parts per million range results in maximum phenol adsorption and longer clay life.

I claim:

1. The process for removing phenolic substances from an aqueous solution which comprises contacting the aqueous solution with an adsorbent clay selected from the group consisting of an adsorbent clay which has been employed to decolorize an animal oil and which has been subjected to at least one combustion regeneration to burn off and remove carbonaceous material deposited thereon during said decolorization of an animal oil, an adsorbent clay which has been used to decolorize a vegetable oil and which has been subjected to at least one combustion regeneration to burn off and remove carbonaceous material deposited thereon during said decolorization of a vegetable oil, an adsorbent clay which has been used to decolorize a petroleum lubricating oil and which has been subjected to at least one combustion regeneration to burn off and remove carbonaceous material deposited thereon during said decolorization of a petroleum lubricating oil, an adsorbent clay which has been employed to refine gasoline and which has been subjected to at least one combustion regeneration to burn off and remove carbonaceous material deposited thereon during said refining of gasoline, an activated clay which has been employed for the catalytic cracking of a petroleum fraction to produce lower boiling hydrocarbons, which activated clay has been subjected to at least one combustion regeneration to burn off and remove carbonaceous material deposited thereon during said catalytic cracking and a synthetic silica-alumina cracking catalyst which has been employed for the catalytic cracking of a petroleum fraction to produce lower boiling hydrocarbons, which catalyst has been subjected to at least one combustion regeneration to burn off and remove carbonaceous material deposited thereon during said catalytic cracking, and thereafter separating water from said adsorbent clay, said water having a lower phenolic content than the water initially contacted with the adsorbent.

2. The process defined in claim 1 in which the adsorbent clay contacted with the aqueous solution is an adsorbent clay which has become substantially spent by repeated reuse to decolorize a petroleum lubricating oil and repeated combustion regeneration.

3. The process defined in claim 1 in which the adsorbent clay contacted with the aqueous solution is an adsorbent clay which has become substantially spent by repeated reuse to refine gasoline and repeated combustion regeneration.

4. The process defined in claim 1 in which the adsorbent clay contacted with the aqueous solution is an activated clay which has become substantially spent by repeated reuse to catalytically crack a petroleum fraction and repeated combustion regeneration.

5. The process defined in claim 1 in which the adsorbent clay contacted with the aqueous solution is a synthetic silica-alumina cracking catalyst which has become substantially spent by repeated reuse to catalytically crack a petroleum fraction and repeated combustion regeneration.

6. The process for removing phenolic substances from an aqueous solution which contains between about 40 and 12,000 parts per million of phenolic substance which process comprises contacting the aqueous solution with an adsorbent clay selected from the group consisting of an adsorbent clay which has been employed to decolorize an animal oil and which has been subjected to at least one combustion regeneration to burn off and remove carbonaceous material deposited thereon during said decolorization of an animal oil, an adsorbent clay which has eben used to decolorize a vegetable oil and which has been subjected to at least one combustion regeneration to burn off and remove carbonaceous material deposited thereon during said decolorization of a vegetable oil, an adsorbent clay which has been used to decolorize a petroleum lubricating oil and which has been subjected to at least one combustion regeneration to burn off and remove carbonaceous material deposited thereon during said decolorization of a petroleum lubricating oil, an adsorbent clay which has been employed to refine gasoline and which has been subjected to at least one combustion regeneration to burn off and remove carbonaceous material deposited thereon during said refining of gasoline, an activated clay which has been employed for the catalytic cracking of a petroleum fraction to produce lower boiling hydrocarbons, which activated clay has been subjected to at least one combustion regeneration to burn off and remove carbonaceous material deposited thereon during said catalytic cracking and a synthetic silica-alumina cracking catalyst which has been employed for the catalytic cracking of a petroleum fraction to produce lower boiling hydrocarbons, which catalyst has been subjected to at least one combustion regeneration to burn off and remove carbonaceous material deposited thereon during said catalytic cracking, separating the water from said adsorbent clay, said water having a lower phenolic content than the water initially contacted with the adsorbent clay, continuing said contacting until a substantial amount of phenolic substance has been adsorbed, subjecting the adsorbent clay to a regeneration treatment, and reusing the regenerated adsorbent clay for adsorption of additional phenolic substances from an aqueous solution.

7. The process for removing phenolic substances from an aqueous solution which contains between about 3000 and 10,000 parts per million of phenolic substance which process comprises contacting the aqueous solution with an adsorbent clay which has been used to decolorize a petroleum lubricating oil and which has been subjected to at least one combustion regeneration to burn off and remove carbonaceous material deposited thereon during said decolorization of a petroleum lubricating oil, separating water from said adsorbent clay, said water having a lower phenolic content than the water initially contacted with the adsorbent clay, continuing said contacting until a substantial amount of phenolic substance has been adsorbed, subjecting the adsorbent clay to a regeneration treatment, and reusing the regenerated adsorbent clay for adsorption of additional phenolic substances from an aqueous solution.

8. The process for removing phenolic substances from an aqueous solution which contains between about 3000 and 10,000 parts per million of phenolic substance which process comprises contacting the aqueous solution with an adsorbent clay which has become substantially spent by repeated reuse to decolorize a petroleum lubricating oil and repeated combustion regeneration to burn off and remove carbonaceous material deposited thereon during said decolorization of a petroleum lubricating oil, separating water from said adsorbent clay, said water having a lower phenolic content than the water initially contacted with the adsorbent clay, continuing said contacting until adsorption of phenolic substances decreases to a substantial extent, subjecting the adsorbent clay to a regeneration treatment, and reusing the regenerated adsorbent clay for adsorption of additional phenolic substances from an aqueous solution.

References Cited in the file of this patent
UNITED STATES PATENTS

| Number | Name | Date |
|---|---|---|
| Re. 16,225 | Wooster | Dec. 15, 1925 |
| 1,249,041 | Demme | Dec. 4, 1917 |
| 1,479,851 | Demme | Jan. 8, 1924 |
| 1,610,408 | Alexander | Dec. 14, 1926 |
| 2,003,314 | Russell et al. | June 4, 1935 |
| 2,213,330 | Wahlstrom | Sept. 3, 1940 |
| 2,600,379 | Daumani | June 17, 1952 |

OTHER REFERENCES

Cassidy: "Adsorption and Chromatography," New York, Interscience, 1951, page 206.

Rudolfs: "Industrial Wastes," New York, Reinhold, 1953, page 406.

Mantell: "Adsorption," New York, McGraw-Hill, 1951, page 50.

UNITED STATES PATENT OFFICE
CERTIFICATE OF CORRECTION

Patent No. 2,937,142 May 17, 1960

Carlos B. Rios

It is hereby certified that error appears in the printed specification of the above numbered patent requiring correction and that the said Letters Patent should read as corrected below.

Columns 7 and 8, Table I, second major column thereof, and opposite "Maximum clay life, hrs.", for "8.1" read -- 8.0 --; same columns 7 and 8, Table II, first column thereof, third line from bottom of column, for "1.641 gal./hr./cu. ft.," read -- 1.461 gal./hr./cu. ft., --; column 10, line 36, for "eben" read -- been --.

Signed and sealed this 18th day of October 1960.

(SEAL)
Attest:

KARL H. AXLINE
Attesting Officer

ROBERT C. WATSON
Commissioner of Patents